United States Patent [19]

Weiner

[11] Patent Number: 4,719,725

[45] Date of Patent: Jan. 19, 1988

[54] MOBILE DISPLAY APPARATUS FOR STORES

[75] Inventor: Gordon M. Weiner, Richmond, Va.

[73] Assignee: Prince Frederick C & A, Inc., Richmond, Va.

[21] Appl. No.: 910,237

[22] Filed: Sep. 16, 1986

[51] Int. Cl.[4] .................... E04H 3/04; B65G 17/32

[52] U.S. Cl. .................... 52/31; 186/57; 186/69; 198/678

[58] Field of Search .................... 52/31; 198/678; 186/55, 186/57, 69

[56] References Cited

U.S. PATENT DOCUMENTS

| | | | |
|---|---|---|---|
| 1,347,936 | 7/1920 | Carroll | 52/31 |
| 1,703,477 | 2/1929 | Conder | 52/31 |
| 1,861,671 | 6/1932 | Webb | 52/31 |
| 1,882,488 | 10/1932 | Ellis | 52/31 |
| 2,096,959 | 10/1937 | Clerc | 186/57 |
| 2,628,691 | 2/1953 | Barrett | 186/69 |
| 4,354,575 | 10/1982 | Andersson | 198/678 |

FOREIGN PATENT DOCUMENTS

| | | | |
|---|---|---|---|
| 486150 | 10/1929 | Fed. Rep. of Germany | 186/57 |

*Primary Examiner*—William F. Pate, III
*Assistant Examiner*—Michael Safavi
*Attorney, Agent, or Firm*—Mason, Fenwick & Lawrence

[57] ABSTRACT

A store display apparatus is provided for a retail store having a transparent window or wall adjacent a public walk. The display apparatus includes a conveyor extending near the window or wall for providing a moving display of articles on sale to passers-by on the public walk. The conveyor preferably extends into the store and comprises a flexible element.

2 Claims, 4 Drawing Figures

MOBILE DISPLAY APPARATUS FOR STORES

BACKGROUND OF THE INVENTION

The present invention relates to retail sales stores, and more particularly to display apparatus for articles to be sold in such stores.

Retail sales stores traditionally have displays of the articles which are offered for sale. These displays are provided in a sales floor area where the articles are usually displayed, in a matter so as to attract the attention and interest of potential buyers. This sales floor area also includes a station where the customer pays for the purchase made, and a clerk wraps the purchase for the customer.

In order to attract customers into retail sales stores, it has been traditional to incorporate into the structure of such stores a "display window". A display window may take many forms, one well known form being an enclosure having a wall of transparent glass adjacent to a public walk, and possibly one or more additional transparent walls adjacent an entrance way into the store. There may also be provided one or more "back walls" separating the display window area from the sales floor area. In some instances, the display window has no back wall, and the transparent wall is a wall forming a boundary between the sales and display area of the store and the public walk.

Retail stores are located adjacent a public walk, which may be either a side walk, extending in front of a number of retail stores, or, in the case of large department stores, a public walk may be the sidewalk extending the length of the block in front of a department store, usually having display windows there along.

More recently, shopping malls have arisen in which the public walk in not a side walk bordering a street for vehicles, but is a walkway, usually of considerable extent, and often bounded along two generally parallel sides by a variety of retail stores. Such retail stores may have various configurations, as above discussed, including separate display windows and transparent glass walls forming part of the boundary between the retail store and the public walk.

It has been recognized that mobile display are useful for attracting attention, and mobile apparatus has been provided for displaying pictorial matter, merchandise and models. Wengel U.S. Pat. No. 3,221,666 discloses a display device of that nature wherein a carriage is caused to reciprocate between two locations, which may be within a store. Also of interest is Rasmussen U.S. Pat. No. 3,066,432, which provides a reciprocating indoor or outdoor advertising display device including trolleys moving in a path to and from a central display.

The aesthetic displays provided both in display windows of stores and near transparent walls of stores have not been as eye-catching as attractive and as likely to generate sales as is desirable. Where mobile displays have been utilized, they have only been placed wholly within a store, or have been placed outside a store, for advertising purposes.

SUMMARY OF THE INVENTION

There is provided a mobile display apparatus in combination with a store, the mobile display apparatus at least in part extending adjacent a transparent wall or window, or an entranceway of a store so as to be readily visible to passers-by on the adjacent public walk. The mobile display apparatus preferably is a conveyor having a movable element which extends adjacent a glass wall bounding the store, which may be a window wall or the glass of a display window, and which preferably also extends into the sales floor area of the store, the flexible element having supports extending from it to which articles to be sold may be attached. The flexible element is preferably driven, as by a motor and sprocket where the flexible element is a chain, and a hollow guide of housing is provided for determining the path of the flexible element, which extends within the hollow guide. The hollow guide is secured in position by suitable brackets or by other support elements, and the flexible element is preferably one which may be articulated about mutually transverse pivots so that it may move in arcuate portions of its path which are in horizontal, inclined or vertical planes, as may be desirable.

Among the objects of the present invention is to provide a mobile display apparatus for articles to be sold which is located in a store adjacent to and viewable from the public walk adjacent the store.

Another object of the present invention is the provision of such a mobile display apparatus which extends adjacent a transparent window or wall of a store.

Yet another object of the present invention is to provide a mobile display apparatus for merchandise which extends through a display window of a store, and also through the sales and display area of the store.

Still another object of the present invention is the provision of a mobile display apparatus which will be effective in attracting the attention of passersby on a public walk adjacent a store by moving articles to be sold adjacent to and visible from a public walk adjacent the portion of the store which abuts the public walk.

Other objects and many of the attendant advantages of present invention will be readily understood from consideration of the following specification, claims and drawings.

DESCRIPTION OF THE PREFERRED EMBODIMENTS

Figure 1:
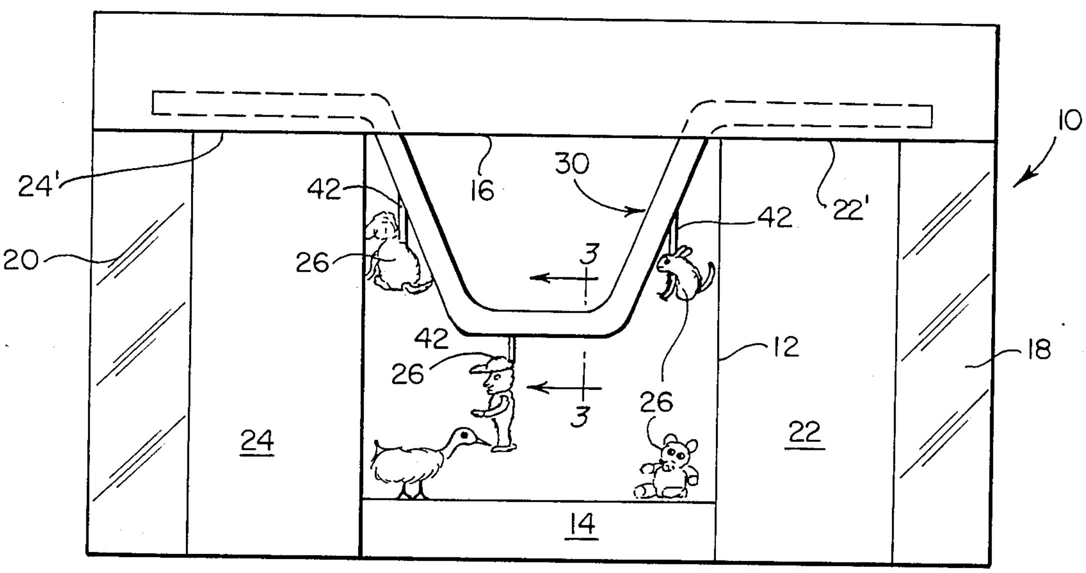
FIG. 1 is an elevational view of a store having a display apparatus in accordance with the present invention associated therewith.

Referring now to the drawings, wherein like or corresponding reference numerals are used for like or corresponding parts throughout the several views, there is shown in FIG. 1 a store generally designated 10 which is located directly adjacent a public walk. The store front illustrated in FIG. 1 includes a central display window 12 having a floor 14 and a ceiling 16. On either side of the central display window 12 there are provided side display windows 18 and 20. A doorway 22 is between the display windows 12 and 18 and doorway 24 is between the display windows 12 and 20. As will be understood, these doorways provides entrances into the store 10 and extend from the floor to an upper boundary 22', 24' at a height sufficient for the passage of persons without bending.

Although there may be displayed and sold various objects in the store 10, there is illustrated in FIG. 1 various stuffed FIGS. 26, which may be animals, fish, birds, stylized humans, etc.

Extending through the display window 12 is a part of a conveyor 30, portions of conveyor 30 extending upwardly through the ceiling 16 of display window 12 and thence into the area of the store where articles are displayed and sold, known as the "sales floor" area. In the sales floor area, the conveyor 30 is supported at an upper level which, as shown, is above the upper boundaries 22', 24' of the doorways 22 and 24, and substantially above the lower level thereof which is in the display window 12. The conveyor 30 includes a movable element not shown in FIG. 1, having supports 42, which support the FIGS. 26 in serial array.

Figure 2:
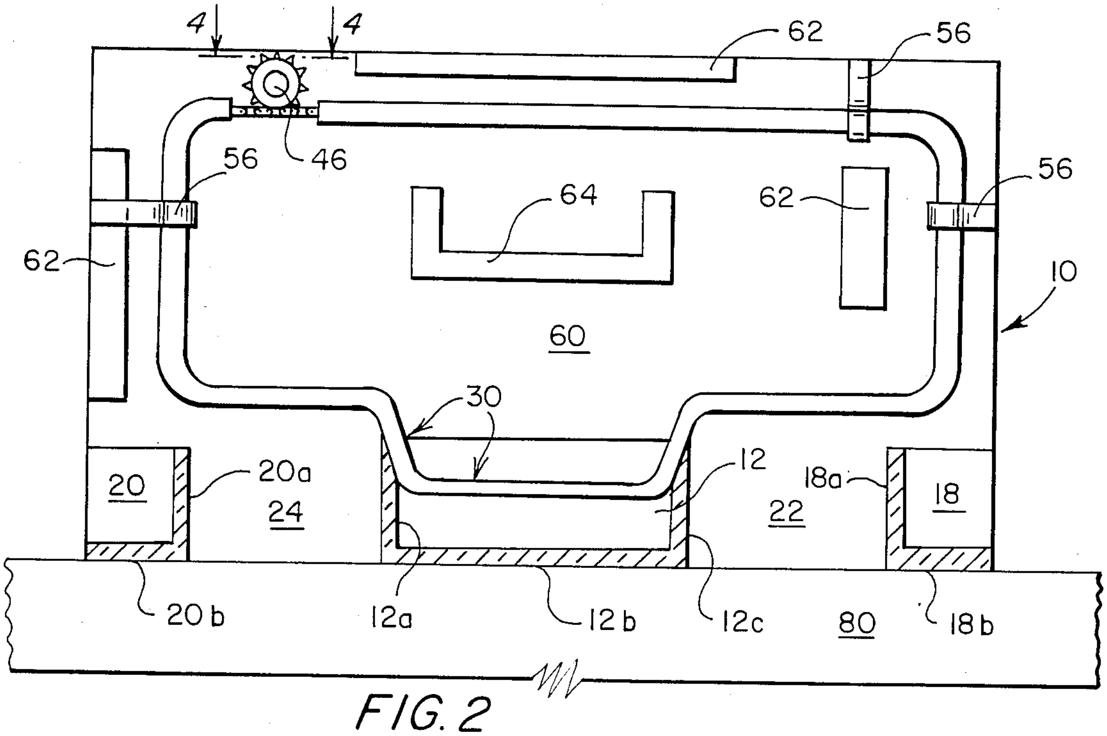
FIG. 2 is a plan view, partly schematic and in section, of the store shown in FIG. 1.

Referring now to FIG. 2, there may be seen in plan view the store 10 including the central display window 12 and the additional display windows 18 and 20. The display window 12 is defined in part by glass walls, 12*a*, 12*b*, and 12*c*, and similarly display windows 18 and 20 are defined in part by glass walls 18*a* and 18*b*, and 20*a* and 20*b* respectively. The store 10 includes the sales floor area 60 which may include display shelves 62 and a cashier and wrapping station 64, for example. The conveyor 30 will be seen to extend not only in the window 12, but about the sales floor area, so as to convey articles to be sold, such as stuffed figures about the various parts of the sales floor area 60, supported by brackets 56.

Adjacent the front of the store 10 is a public walk 80, shown partially broken away. Passersby on the public walk 80 will, be able to view articles in the display windows 12, 18 and 20 through the glass walls forming all or part of those display windows. Where the area of the store 10 which is located in adjacent relationship to public walk 80 does not include display windows as illustrated in FIGS. 1 and 2, those areas are usually visible to passersby on the public walk 80, either through transparent glass walls, entrance ways, or even open grill work, and the conveyor 30, in accordance with the present invention, would be placed in such visible areas of the store 10.

Figure 3:
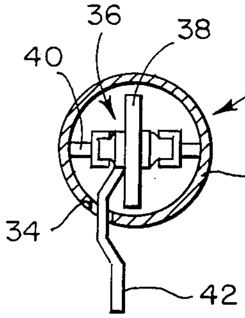
FIG. 3 is a cross sectional view taken on the line 3—3 of FIG. 1.

Referring to FIG. 3, there is shown, partially in cross section, a conveyor 30. Conveyor 30 is of a known construction, such as is produced by Litton Industries, Inc. under the trademark Chainveyor. The conveyor 30 includes a tubular housing 32 which is of generally annular configuration in cross section, having a slot 34 which is off-set from the central vertical plane of housing 32. Within the housing 32 there is an endless chain 36, which is flexible, having wheels 38 extending in a vertical plane and wheels 40 extending in a horizontal plane. A support 42 is shown, to which a toy FIG. 26 may be readily attached.

Figure 4:
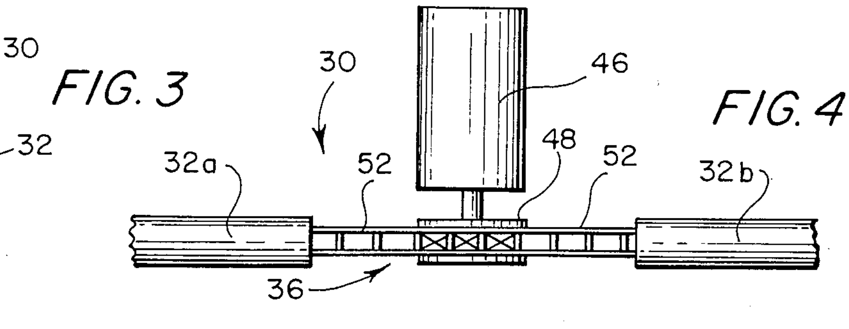
FIG. 4 is a cross section view taken on the line 4—4 of FIG. 2.

In FIG. 4 there is shown a portion of the conveyor 30 including a first housing portion 32*a* and a second housing portion 32*b* which are in space relationship, with the endless chain or flexible element 36 extending in the space between them. A drive motor 46 causes rotation of a sprocket 48, which is in engagement with the flexible chain 36, to cause it to be driven through the hollow guide housing 32, thereby to move the figures 26 carried by the supports 42 along the path of conveyor 30. The chain 36 has some adjacent links articulated about vertical axes 52, and other links articulated about transverse axes which are mutually perpendicular to the axes 52. Due to this construction, the conveyor 30 may extend at different height within the store 10, as shown FIG. 1, and the flexible chain element 36 may traverse arcs about axes which are vertical, horizontal, and/or inclined, thereby to be located in the most desirable way for attention getting and sales of merchandise.

There has been provided a store and display apparatus which is highly effective in attracting passersby near a store by displaying moving articles on a conveyor in a region on the store visible to the passersby, and preferably, displaying the moving articles also within the store. The mobile display apparatus may extend at least in part through a display window of the store.

It will be obvious to those skilled in the art that various changes may be made without departing from the spirit of the invention, and therefore the invention is not limited to that shown in the drawings and described in the specification, but only as indicated in the appended claims.

What is claimed is:

1. In combination with a store which comprises a sales floor area, at least one doorway for providing entry into said store and having an upper boundary, a transparent wall adjacent a public walk whereby passers-by on the public walk may view articles through said wall, a conveyor, said conveyor comprising a linear flexible chain-like element of small cross-section in comparison to its length and capable of traversing arcs about axes which are angularly related to each other, means for driving said linear flexible element, support means carried by said linear flexible element for supporting articles in spaced apart relationship along the length thereof, means in the sales floor area for supporting at least a part of said flexible element at a relatively high level at or adjacent the upper boundary of said doorway, and support means for guiding said flexible element from said upper level to a lower level, said flexible element at said lower level being adjacent said transparent wall, said lower level of said flexible element being substantially below said upper level;

whereby articles carried by said support means are caused to move in serial array by said conveyor at said relatively higher level in said sales floor area, and to move in serial array at a lower level adjacent said transparent wall.

2. In combination with a store which comprises a sales floor area, and at least one doorway for providing entry into said store and having an upper boundary, a display window having a transparent wall adjacent a public walk whereby passers-by on the public walk may view articles in said display window, said display window having a ceiling, a conveyor, said conveyor comprising a linear flexible chain-like element of small cross-section in comparison to its length and capable of traversing arcs about axes which are angularly related to each other, means for driving said linear flexible element, support means carried by said linear flexible element for supporting articles in spaced apart relationship along the length thereof, means in the sales floor area for supporting at least a part of said flexible element at a relatively high level at or adjacent the upper boundary of said doorway, and support means for guiding said flexible element from said upper level to a lower level, said flexible element at said lower level being adjacent said transparent wall, said lower level of said flexible element being substantially below said upper level, said linear flexible element passing into said display window through said ceiling;

whereby articles carried by said support means are caused to move by said conveyor at said relatively higher level in said sales floor area, and to move in serial array at a lower level adjacent said display window.

* * * * *